United States Patent [19]

Hamada

[11] Patent Number: 5,462,305

[45] Date of Patent: Oct. 31, 1995

[54] AIRBAG RESTRAINT UNIT

[75] Inventor: Shinji Hamada, Ayase, Japan

[73] Assignee: Ikeda Bussan Co., Ltd., Ayase, Japan

[21] Appl. No.: 73,074

[22] Filed: Jun. 8, 1993

[30] Foreign Application Priority Data

Jun. 11, 1992 [JP] Japan .................................. 4-177528

[51] Int. Cl.$^6$ ................................................. B60R 21/20
[52] U.S. Cl. ........................................ 280/728.2; 280/732
[58] Field of Search ........................... 280/728 A, 728 B, 280/732, 728 R, 728.1, 728.2, 728.3

[56]  References Cited

U.S. PATENT DOCUMENTS

| 4,153,273 | 5/1979 | Risko | 280/732 |
|---|---|---|---|
| 5,069,480 | 12/1991 | Good | 280/728 A |
| 5,096,222 | 3/1992 | Komerska et al. | 280/728 A |
| 5,217,254 | 6/1993 | Satoh | 280/732 |
| 5,234,227 | 8/1993 | Webber | 280/732 |

FOREIGN PATENT DOCUMENTS

| 56-43890 | 10/1981 | Japan . | |
|---|---|---|---|
| 61-185642 | 11/1986 | Japan . | |
| 2-38360 | 3/1990 | Japan . | |
| 2246984 | 2/1992 | United Kingdom | 280/728 A |

Primary Examiner—Karin L. Tyson
Attorney, Agent, or Firm—Foley & Lardner

[57] ABSTRACT

An airbag restraint unit for protecting a vehicle passenger from application of impact in the event of a serious vehicle collision. The airbag restraint unit having a gas generator storage container, as a sealed container in which a generally cylindrical gas generator is disposed. An airbag is sealingly and securely attached to the storage container in such a manner that high pressure gas from the gas generator is introduced into the airbag in the event of the vehicle collision. The storage container is provided at its inside with support sections for the gas generator, projecting inside the storage container. During assembly of the unit, the gas generator is inserted into the storage container through a hole formed in a side end wall of the storage container and slidingly moved toward an opposite side end wall upon contacting with the support sections. The gas generator is provided at its tip end with a bolt section which is fixed to the side end wall with a nut so that the gas generator is fixed in position.

9 Claims, 7 Drawing Sheets

AIRBAG RESTRAINT UNIT

BACKGROUND OF THE INVENTION

1. Field of the Invention

This invention relates to an airbag restraint unit for protecting a passenger of a vehicle or the like in the event of a serious collision, and more particularly to such an airbag restraint unit of the type wherein an airbag is secured to a storage container storing therein a gas generator, in a manner that gas from the gas generator is introduced into the airbag when the gas generator is operated.

2. Description of the Prior Art

A variety of airbag restraint units for automotive vehicles or the like have been hitherto proposed and put into practical use as disclosed, for example, in Japanese Utility Model Provisional Publication No. 2,38360, Japanese Patent Publication No. 56-43890 and Japanese Utility Model Provisional Publication No. 61-185642.

Such an airbag restraint unit will be briefly discussed with reference to a schematic illustration of FIG. 10, in which the airbag restraint unit is designated by the reference numeral 1. The airbag restraint unit 1 is disposed inside an instrument panel 2 of an automotive vehicle and located such that the top thereof is closed to the inner surface of the instrument panel 2. The airbag restraint unit 1 is fixedly mounted on a support arm 4, which is mounted on a cross member 3. The airbag restraint unit 1 includes a lower base 6 which serves as a container for storing a gas generator 5. An airbag 7 is fixedly secured to the lower base 6 so that gas flows into the airbag 7 when the gas generator 5 is operated to eject gas.

An airbag cover 8 is fixedly secured to the upper end section of the lower base 6 in order to cover the airbag 7 when in a folded state. In the event of a vehicle collision or the like, the airbag 7 is inflated upon being supplied with gas flown from the gas generator 5. The inflated airbag opens the airbag cover 8 and extends or protrudes toward a vehicle passenger to protect the passenger.

Difficulties have been encountered in such a conventional airbag restraint unit, in which it is unavoidable that a clearance or aperture is formed between the airbag 7 and the lower base at an installation section for the airbag. More specifically, in the conventional airbag restraint unit 1, retaining the airbag 7 to the lower base 6 is done by putting the opening side end section of the airbag 7 between the upper open end section (opened to the upper side) of the lower base 6 and a retainer (not shown) of the rectangular frame type, fastened to the upper open end section of the lower base 6 with small screws (not shown). The opening side end section of the airbag 7 is formed with a plurality of cutouts located at the four corner sections of the frame type retainer and at the small screws, and therefore the clearance or aperture is unavoidably formed in an installation section of the airbag 7 to the lower base 6.

Under formation such a clearance or aperture, it is unavoidable that gas ejected from the gas generator 5 leaks out of the airbag restraint unit 1 through the installation section of the airbag 7 to the lower base 6. As a result, it becomes difficult to obtain a sufficient amount of gas to inflate the airbag 7, thereby making impossible an effective use of gas generated from the gas generator 5. Thus, inflation of the airbag 7 is made ineffective so that there is the possibility of the airbag restraining performance for the passenger being deteriorated.

Further difficulties have been encountered in the above conventional airbag restraint unit 1 as set forth below. The gas generator 5 is usually assembled in the airbag restraint unit 1 after other parts are assembled in or at the last step in an assembly process from the view point of safety. During the assembly of the gas generator 5 in the airbag restraint unit 1, the gas generator 5 is first inserted into the lower base 6 through an inserting opening formed at a side end of the lower base 6, and then fixed in position. Fixing of the gas generator 5 inside the lower base 6 is accomplished by allowing a bolt section at the tip end of the gas generator 5 to project out of the lower base 6 through an opening formed at the other side end of the lower base 6, the projected bolt section being fastened to the lower base 6 with a washer and a nut.

However, during such assembly of the gas generator 5 in the airbag restraint unit 1, the distance of insertion of the gas generator 5 in the lower base 6 is considerably long as being generally equal to the length of the cylindrical section of the gas generator 5. Additionally, the opening through which the bolt section of the gas generator 5 is inserted is considerably small. As a result, the advancing direction of the gas generator 5 cannot be determined in the course of insertion of the gas generator during the assembly of the gas generator 5 in the airbag restraint unit 1, and therefore the insertion of the bolt section at the tip end of the gas generator 5 cannot be easily made, thus making difficult the assembly operation of the gas generator 5 in the airbag restraint unit 1. In this connection, the opening for the gas generator bolt section is formed enlarged, in which the washer for the bolt section compensates the defect of the enlarged opening. Additionally, the washer functions to prevent the gas generator 5 from rotating and to locate the gas generator 5. In this regard, the washer is required to be formed into a special complicated shape and produced separate from the container of the gas generator, thereby raising the production cost of the airbag restraint unit 1. Such problems have been required to be solved.

SUMMARY OF THE INVENTION

It is an object of the present invention to provide an improved airbag restraint unit which can overcome drawbacks encountered in conventional similar airbag restraint units.

Another object of the present invention is to provide an improved airbag restraint unit which is improved in operational efficiency in an assembly process of the unit while reducing production cost of the unit.

A further object of the present invention is to provide an improved airbag restraint unit by which insertion operation of a gas generator in a gas generator storage container is easily accomplished, reducing the number of constituting parts, for example, omitting a washer that is necessary in a conventional similar airbag restraint unit.

A still further object of the present invention is to provide an improved airbag restraint unit including a gas generator disposed in a storage container, in which the storage container is improved in strength thereby solving problems due to a low strength thereof.

According to the present invention, an airbag restraint unit comprises a gas generator storage container formed with a gas ejection opening. The storage container has first and second end walls which are separate from each other and located opposite to each other. The first end wall is formed with a gas generator insertion hole. The second end wall is formed with a bolt section insertion hole. A gas generator for generating gas is disposed in the storage container and includes an elongate body section. The gas generator has a bolt section located at one end portion of the gas generator body section. The gas generator is inserted into the storage container through the storage container gas generator insertion hole and is brought into a state in which the bolt section is inserted in the storage container bolt section insertion hole to be fastened in position with a nut. An airbag is fixedly secured to the storage container in a manner such that gas from the gas generator is introduced into the airbag through the storage container gas ejection opening. Additionally, at least one support section for supporting the body section of the gas generator is formed inside the storage container and extends generally in a direction traversing the axis of the gas generator body in plan. The support section has a support surface in contact with the surface of the gas generator body section.

According to the above arrangement, during assembly of the airbag restraint unit, insertion of the gas generator into the storage container is stably and smoothly accomplished by virtue of the support section inside the storage container. Similarly, insertion of the gas generator bolt section into the insertion hole of the storage container is easily accomplished to fasten the gas generator in position. These features improve an operational efficiency in an assembly process of the airbag restraint unit by reducing the number of constituting parts of the airbag restraint unit for example, omitting a conventional washer used with the gas generator bolt section.

DETAILED DESCRIPTION OF THE INVENTION

Figure 1:
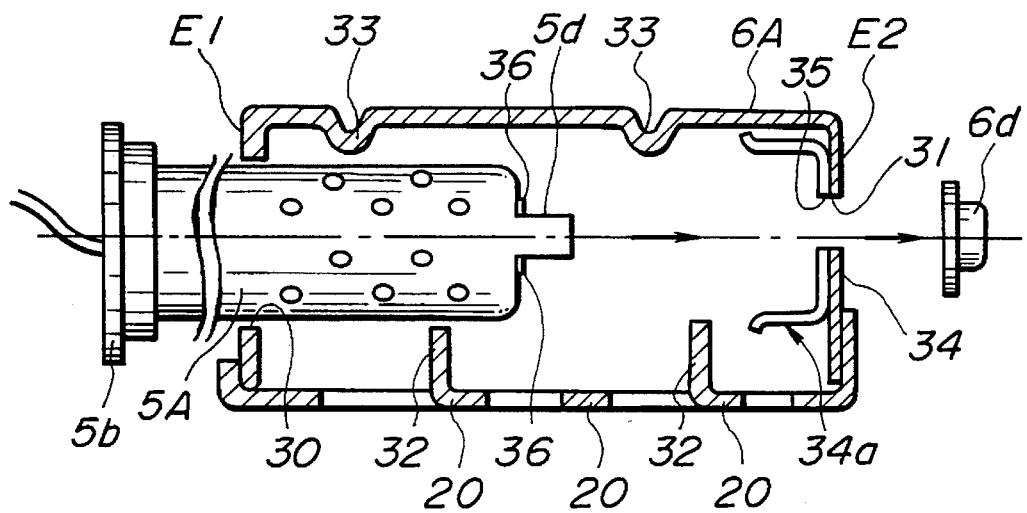
FIG. 1 is a cross-sectional view of an essential part of an embodiment of an airbag restraint unit according to the present invention.

Referring now to FIGS. 1 to 9 of drawings, an embodiment of an airbag restraint unit according to the present invention is illustrated by the reference numeral 1A. In this embodiment, the airbag restraint unit 1A is mounted on an automotive vehicle (not shown) and located in a passenger compartment (not shown) of the vehicle.

Figure 6:
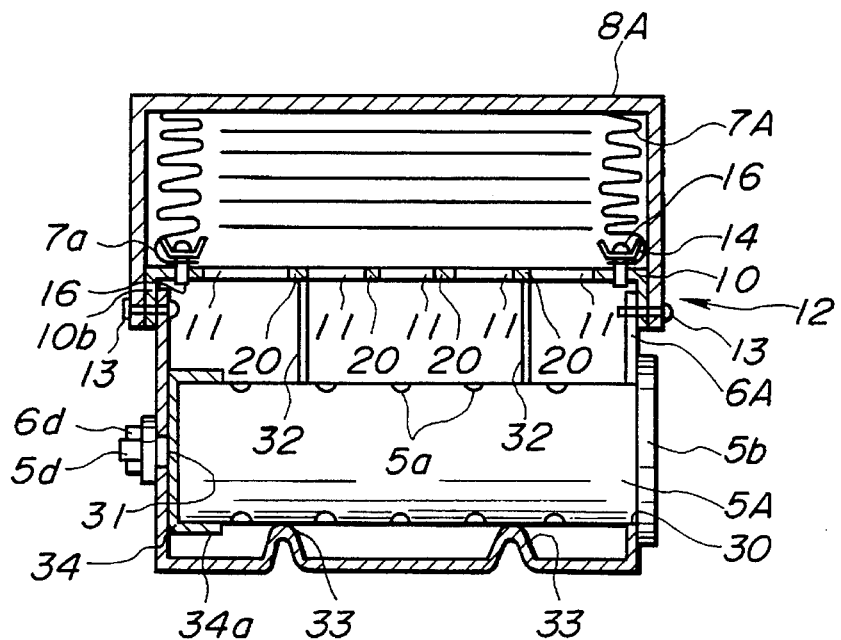
FIG. 6 is a vertical cross-sectional view of the airbag restraint unit of FIG. 1.
Figure 7:
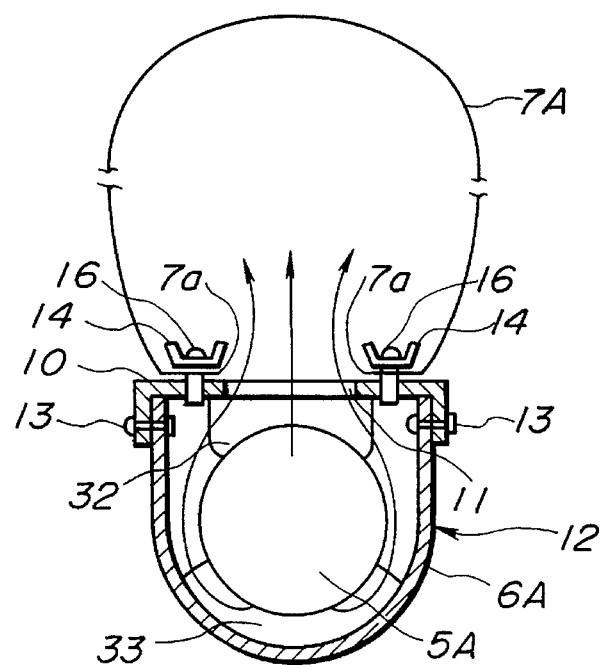
FIG. 7 is a vertical cross-sectional view showing an operational mode of the airbag restraint unit of FIG. 1.

The airbag restraint unit 1A comprises a gas generator storage container 12 in which a gas generator 5A is stored, as shown in FIGS. 6 to 9. The storage container 12 includes a lower base 6A, which is rigidly connected to a vehicle body (not shown) through installation flanges 6b, 6c and disposed stationary in the passenger compartment. The lower base 6A is generally U-shaped in cross-section as shown in FIG. 7 so as to be opened at its upper part to form an upper opening 6a. An upper base 10 is securely fitted on the upper part of the lower base 6A in a manner to cover the upper opening 6a of the lower base 6A. The upper base 10 includes an upper flat portion U which is formed at its central part with a gas ejection opening 11 G which is positioned at a location other than an upper peripheral part or rectangular frame section 10a of the upper flat portion U.

An airbag 7A is fixedly secured to the upper end face of the upper base 10 in a sealing manner such that high pressure gas generated from the gas generator 5 flows into the airbag 7A without leaking. The airbag 7A is folded and located on the upper base 10 and covered with an airbag cover 8A which is fixedly secured to the upper base 10 in a manner to cover the upper surface of the upper base 10 and the folded airbag 7A. The airbag cover 8A is fixed in position with small screws 13 through pressure plates 15 located outside the airbag cover 8A.

Figure 2:
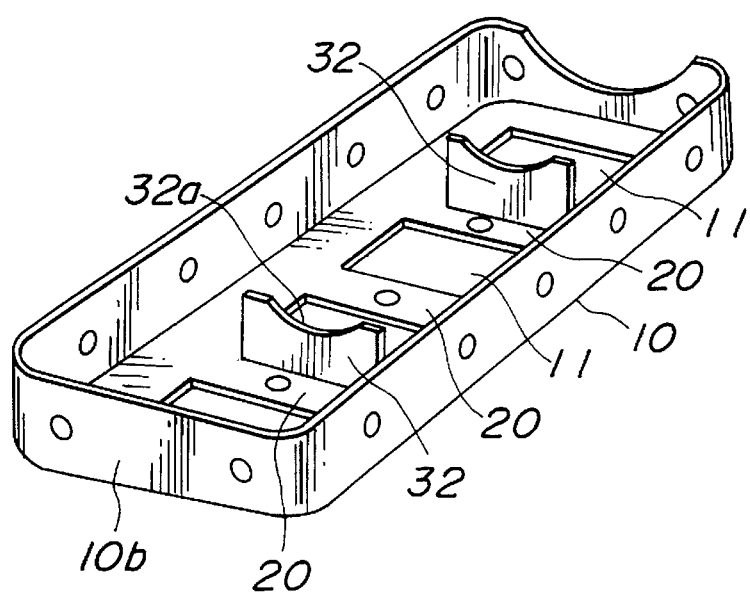
FIG. 2 is a perspective view of an upper base of the airbag restraint unit of FIG. 1.
Figure 3:
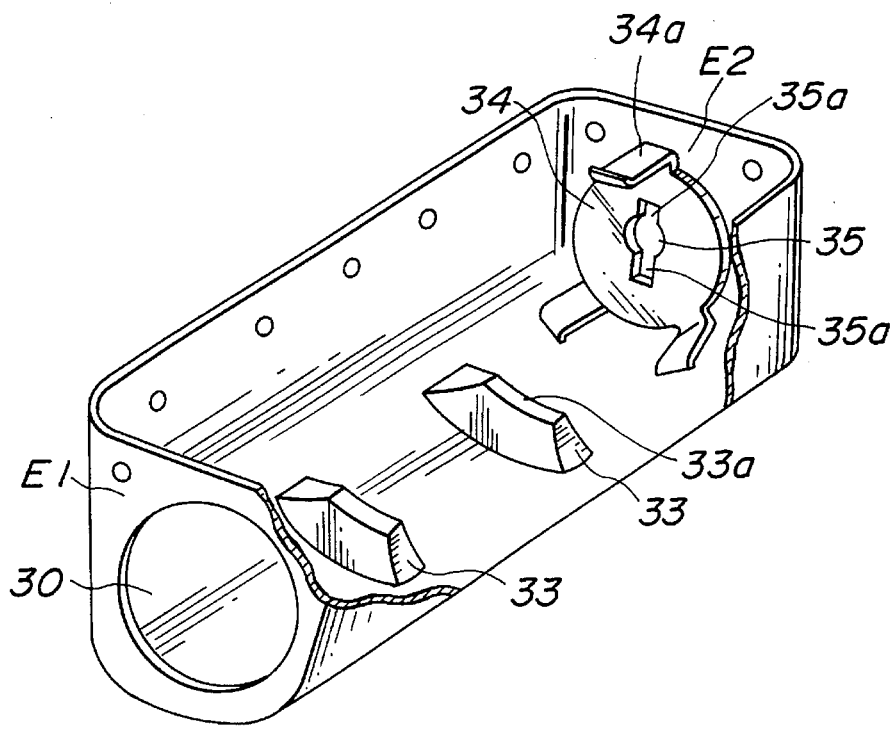
FIG. 3 is a perspective view of a lower base of the airbag restraint unit of FIG. 1.
Figure 5:
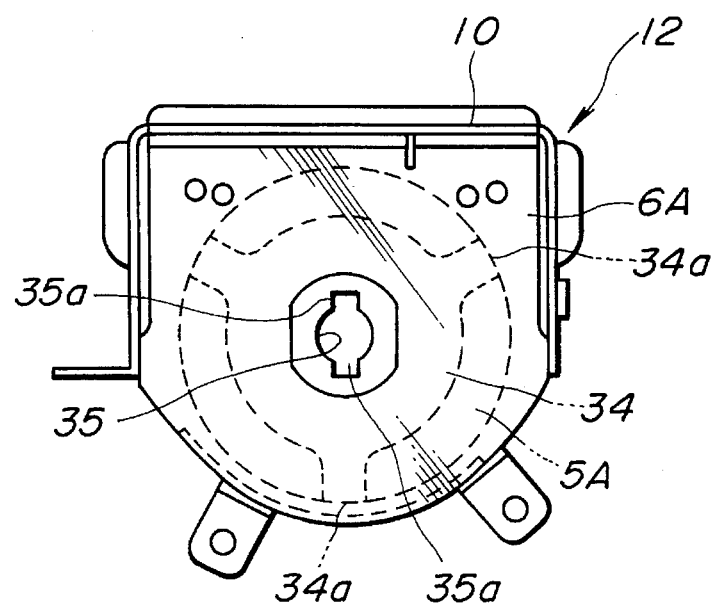
FIG. 5 is a side view of the lower base of FIG. 4.
Figure 4:
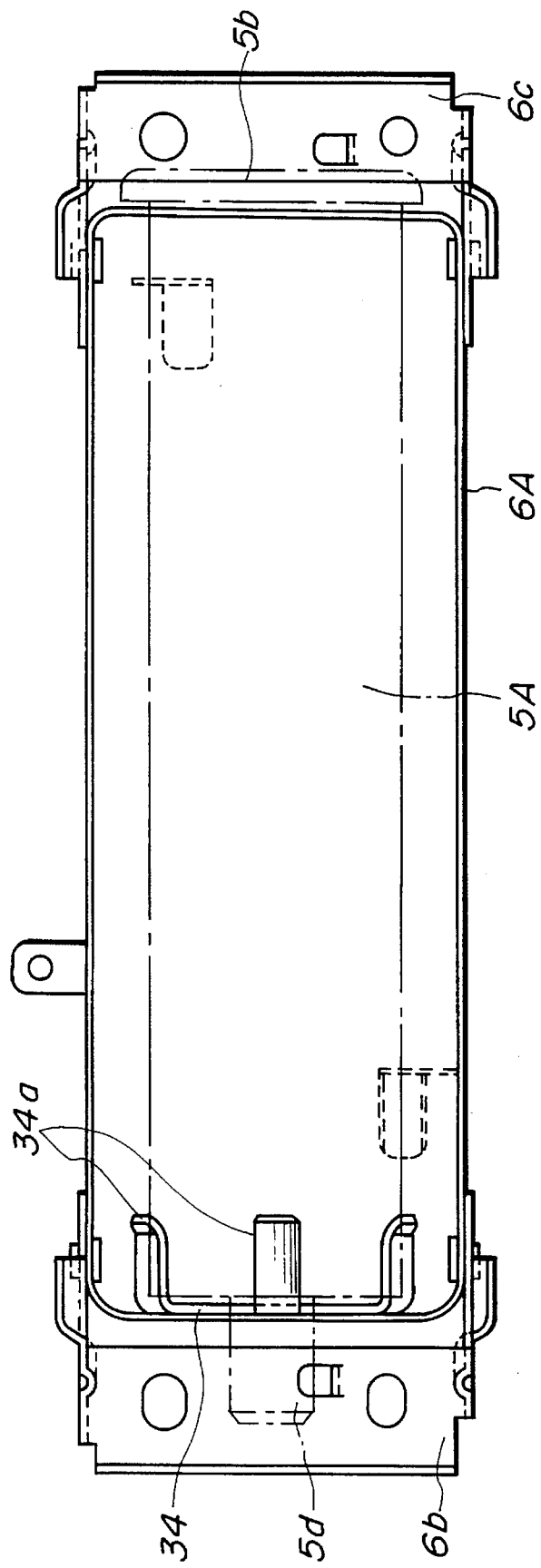
FIG. 4 is a plan view of the lower base of the airbag restraint unit of FIG. 1.
Figure 8:
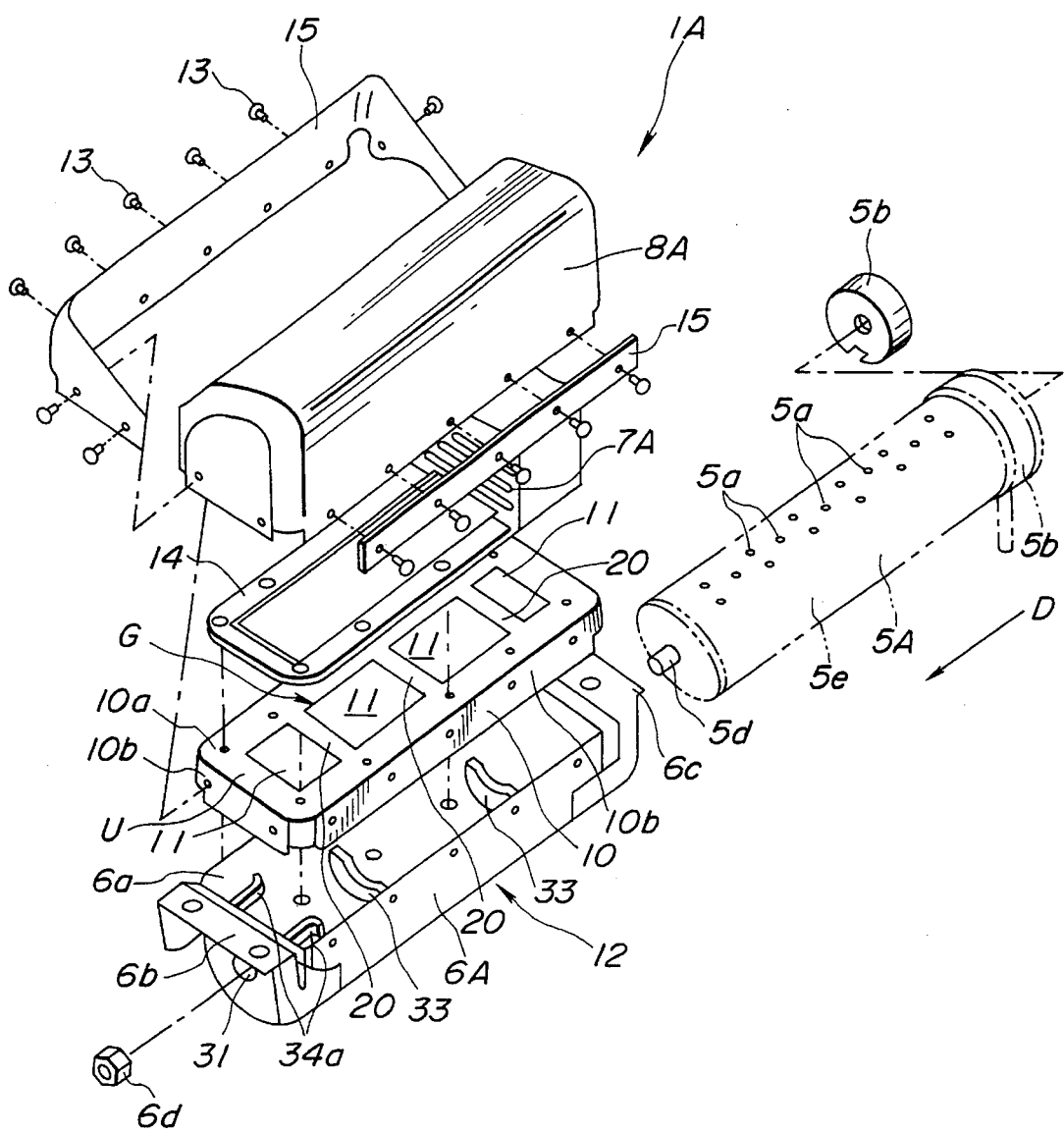
FIG. 8 is an exploded perspective view of the whole airbag restraint unit of FIG. 1.
Figure 9:
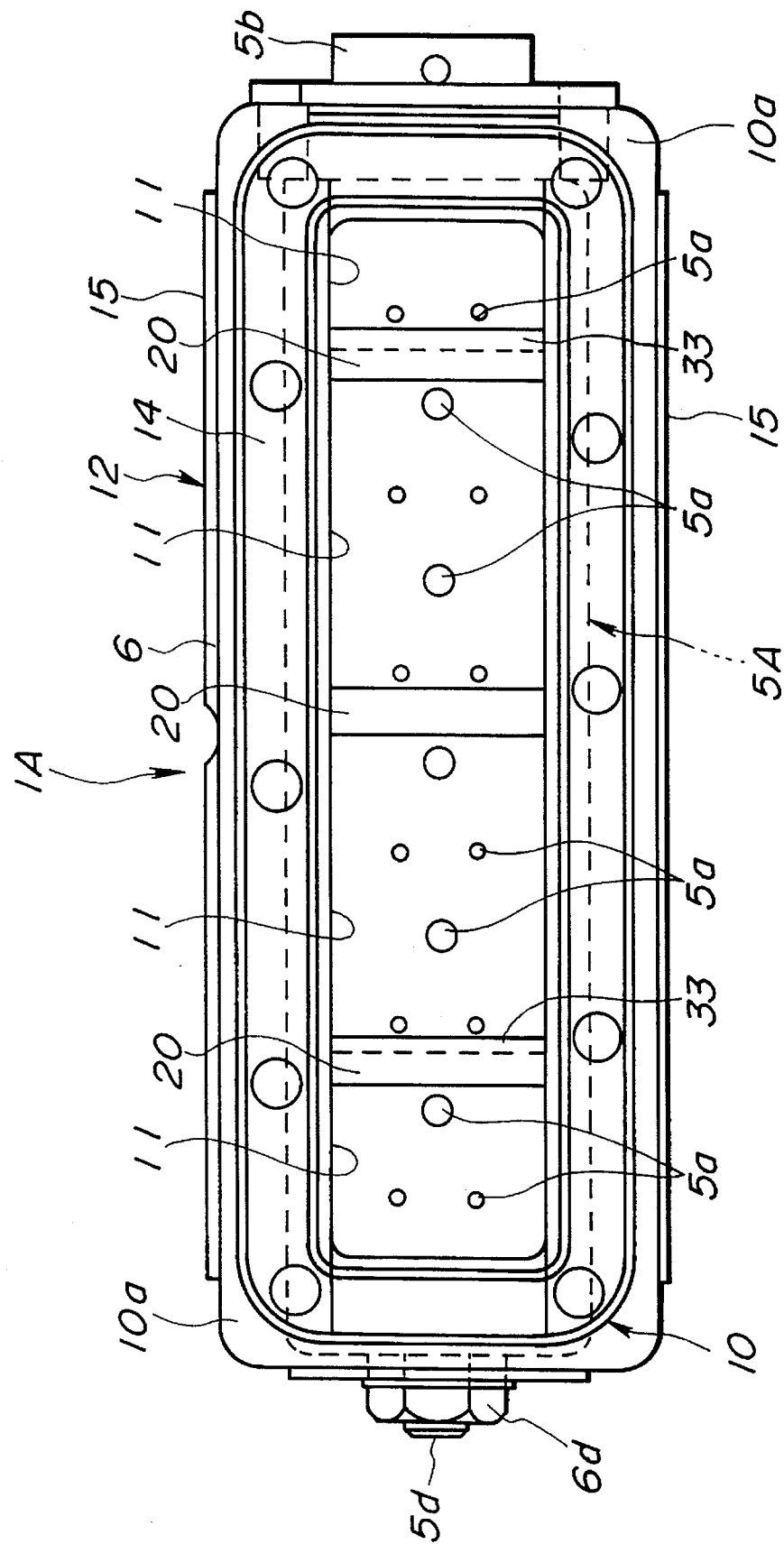
FIG. 9 is a plan view of the airbag restraint unit of FIG. 1 in a state where an airbag and an airbag cover are removed.
Figure 10:
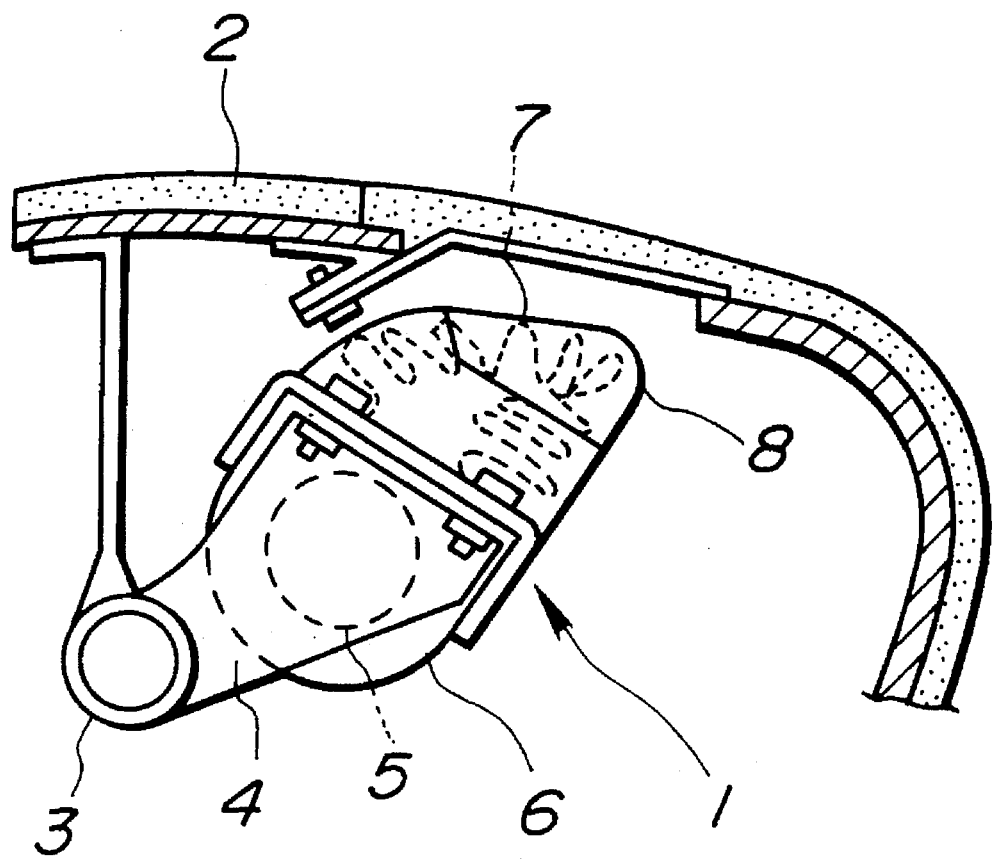
FIG. 10 is a schematic side view of a conventional airbag restraint unit.

In this embodiment, as clearly shown in FIGS. 2, 6 and 8, the gas ejection opening G in the upper base 10 is divided into a plurality of small gas ejection openings 11. More specifically, the upper base 10 is formed of a metal sheet and has the upper rectangular frame section 10a. The upper portion U of the upper base 10 further has a plurality of bridge sections 20 which are located to integrally connect the opposite inner edges of the frame section 10A, defining the small gas ejection openings 11. Each bridge section 20 extends generally in a direction traversing the axis of the gas generator 5A as positioned, in plan. It will be understood that the structure of the lower and upper bases 6A, 10 are not limited to that which has been shown and described.

As shown in FIG. 8, the gas generator 5A includes a body section 5e formed generally cylindrical and formed with a plurality of gas ejection holes 5a. In this connection, the bridge sections 20 are formed respectively at such positions as not to overlap the gas ejection holes 5a of the gas generator 5A, in order that the bridge sections 20 do not interrupt gas ejected upwardly from the gas ejection holes 5a of the gas generator 5A. It will be understood that preventing such gas interruption improves the inflation characteristics of the airbag 7A. The gas generator 5A is provided with an end cover 5b which is located at a rear end in a direction D in which the gas generator 5A is inserted into the lower base 6 during an assembly process of the airbag restraint unit 1A.

The upper base 10 forming part of the gas generator storage container 12 includes a side wall section 10b which is rectangular frame-like in cross-section and integral with the frame section 10a. The side wall section 10b that serves as a first mounting portion is perpendicular to the frame section 10a that serves as a second mounting portion. As shown in FIGS. 6 and 7, when the upper base 10 is fitted on the lower base 6A, the side wall section 10b of the upper base 10 is in fittingly contact with the outer wall surface of the upper part (defining the upper opening 6a) of the lower base 6A, upon which the upper base 10 is fixed in position with small screws 13.

A generally rectangular flame-shaped retainer 14 is disposed on the frame section 10a of the upper base 10 as shown in FIGS. 6 and 7. The peripheral portion 7a (defining an opening through which gas flows in the airbag 7A) of the airbag 7 is put between the frame section 10a of the upper base 10 and the retainer 14 and fixed in position by means of small screws 16 passing through the retainer 14, the airbag peripheral portion 7a and the upper base frame section 10a. The whole peripheral portion 7a of the airbag 7A is located along the whole periphery of the frame section 10a.

The above-arranged airbag restraint unit 1A is assembled as follows: The airbag 7, the retainer 14 and the upper base 10 are first assembled as a single unit under a state in which the peripheral portion 7a of the airbag 7A is put between the retainer 14 and the upper base 10. Then, the airbag 7 is folded. The airbag cover 8 is located to cover the folded airbag 7 and temporarily fixed to the upper base 10. The formed single unit is assembled on the lower base 6A in a manner that the upper base 10 is fitted on and secured to the lower base 6 with the small screws 13 as seen in FIG. 6.

In the arranged airbag restraint unit 1A, the storage container 12 for the gas generator 5A constitutes the lower and upper bases 10, which are fitted and fixed with each other to form a sealed container. Additionally, there is no cutout of the airbag 7A at a planar joining part (no numeral) of the frame section 10a of the upper base 10 and the retainer 14 which is located facing the frame section 10a, so that the fixation of the airbag 7A is accomplished by retaining the peripheral section 7a (defining a gas introduction opening through which gas from the gas generator 5A is introduced) of the airbag 7A wherein section 7a is sufficient in rigidity. Accordingly, a sealing ability of the whole airbag restraint unit 1A can be effectively improved, thereby preventing gas from leaking out of the unit 1A. This ensures a predetermined inflation condition of the airbag 7A, and therefore the vehicle passenger can be effectively protected from an impact in the event of a vehicle collision.

With the above-arranged airbag restraint unit 1A, in the event of a serious vehicle collision, the gas generator 5A generates high pressure gas through its gas ejection holes 5a in response to a signal (not shown) representing the vehicle collision. The gas is introduced into the airbag 7A in an deflated state as shown in FIG. 6 through the gas ejection openings 11 of the upper base 10, so that the airbag 7A momentarily inflates as shown in FIG. 7, breaking the airbag cover 8A. Then, the inflating airbag 7A projects toward the vehicle passenger to provide a soft cushion for the passenger thereby effectively protecting the passenger from application of a collision impact.

As illustrated in FIGS. 1, 2, 3, 4 and 5, in this embodiment, at least one of the upper and lower bases 10, 6A constituting the gas generator storage container 12 is provided with support sections or projections 32, 33 which are in contact with the cylindrical body section 5e of the gas generator 5A so as to support the gas generator 5A. Each support section 32, 33 extends generally in a direction traversing the axis of the gas generator 5A in plan. More specifically, each support section 32, 33 has an elongate arcuate contact surface 32a, 33a which is in contact with the surface of the body section 5e of the gas generator 5A and extends along the curvature of the cylindrical body section 5e.

The lower base 6A is elongated in the direction along which the axis of the gas generator 5A extends, and has an end wall E1 formed with a gas generator insertion hole 30 through which the gas generator 5A is inserted into the lower base 6A during assembly of the airbag restraint unit 1A. The other end wall E2 opposite to the end wall E1 is formed with a bolt section insertion hole 31 through which a bolt section 5d at the tip end of the gas generator body section 5e is inserted. The bolt section insertion hole 31 is formed considerably larger than the diameter of the bolt section 5d. Additionally, a support or retainer bracket 34 is fixedly attached to the inside surface of the end wall E2 of the lower base 6A and at a location corresponding to the bolt section insertion hole 31. The support bracket 34 has three retaining or supporting fingers 34a which extend axially of the lower base 6A so as to guide and retain the tip end section of the gas generator 5A. It will be understood that the gas generator 5A is effectively supported in position under cooperation of the support sections 32, 33 and the retaining fingers 34a of the support bracket 34. The support bracket 34 is formed with a bolt section insertion hole 35 located corresponding to the hole 31 of the lower base end wall E2. The retainer bracket 34 is further formed with upper and lower straight elongate holes 35a, 35a which respectively extend upward and downward from the hole 35. Upon insertion of the bolt section 5d of the gas generator 5A into the holes 35, 31, a nut 6d is engaged on the bolt section 5d thereby to fix the gas generator 5A on the end wall E2 of the lower base 6A.

The above-mentioned support sections 32, 33 are located on the locus of movement of the gas generator 5A during insertion of the gas generator 5A toward a predetermined position in assembly of the airbag restraint unit 1A. The support bracket 34 is located on the extension of the above-mentioned locus. The support sections 32, 33 are formed, for example, by cutting and raising parts of the wall of the upper and lower bases 10, 6A, by being integrally projected from the wall of the bases 10, 6A or by forming projecting parts separately from the bases 10, 6A and integrally connecting the parts on the bases 10, 6A by welding or the like. It will be understood that the support bracket 34 further improves the operational efficiency during insertion of the gas generator 5A into the gas generator storage container 12.

With the above arrangement, during the assembly operation in which the gas generator 5A is inserted from the gas generator insertion hole 30 into the storage container 12 so that the bolt section 5d is passed into the bolt section insertion holes 31, 35 to be fixed with the nut 6d, insertion of the gas generator 5A can be stably and smoothly carried out, and additionally insertion of the gas generator bolt section 5d into the insertion holes 31, 35 can be also carried out easily. This improves the operational efficiency during the assembly process of the airbag restraint unit 1A, and renders the airbag restraint unit of the present invention superior from the view points of management of parts and production cost. Moreover, the above arrangement contributes to a reduction in the number of parts because a conventional washer used with the gas generator bolt section is omitted. Providing the support sections 32, 33 and the support bracket 34 contributes to raising the mechanical strength of the gas generator container 12.

Thus, as discussed above, the upper base 10 is integrally formed with the plural bridge sections 20 defining the plural gas ejection openings 11 and with the gas generator support sections 32, at the locations not to interrupt gas ejected from the gas ejection holes 5a of the gas generator 5A. In this embodiment, each support section 32 is formed integral with the bridge section 20 and projected inward or downward from the inner or back side surface of the bridge section 20. Such a structure increases the rigidity of the upper base 10, which constitutes the sealed gas generator storage container 12 in cooperation with the lower base 6A, thereby solving strength-depending problems of raising deformation of the upper base 10, the retainer 14 and/or the like under the action of high pressure gas being supplied into the airbag 7A when the gas is ejected from the gas generator 5A, and problems of deteriorating a sealing ability of the storage container 12. Such problems can be further effectively solved by locating, particularly, the bridge sections 20 and the support sections 33, 32 in a manner not to overlap the gas ejection holes 5a of the gas generator 5A in plan.

Since the above support sections 32, 33 and the support bracket 34 has a locationing function for the gas generator 5A during insertion of the gas generator 5A into the storage container 12, suitable locationing for the gas generator may be accomplished even if the size of the bolt section insertion hole 31 at the end wall E1 of the lower base 6A is relatively large for the purpose of facilitating the insertion of the bolt section 5d into the insertion hole 31. It will be understood that increasing the thickness of the support sections 32, 33 is preferable to be advantageous from the view point of strength of the gas generator container 12 in case that the thickness of the walls of the lower and upper bases 6A, 10 are relatively small.

In practice, insertion of the gas generator 5A into the storage container 12 is usually carried out under a condition in which the upper and lower bases 10, 6A are reversely located as shown in FIG. 1.

As discussed above, the support bracket 34 is formed with the upper and lower straight elongate holes 35a, 35a contiguous with the bolt section insertion hole 35. In this connection, the gas generator 5A is formed with engagement sections 36, 36 located contiguous with the bolt section 5d of the gas generator 5A. The engagement sections 36, 36 are formed to be fitted in or engaged with the upper and lower straight elongate holes 35a, 35a of the support bracket 34. Thus, the support bracket elongate holes 35a, 35a and the gas generator engagement sections 36, 36 serve as means for preventing the gas generator 5A from rotating around its axis. Accordingly, the assembly operation of the gas generator 5A in the airbag restraint unit 1A can be securely accomplished while ensuring that gas ejection from the gas generator 5A is made in a predetermined effective state or direction of the gas generator 5A While only the above-discussed structure has been shown and described as the gas generator rotation preventing means, it will be understood that other structures may be used for the same means in which, for example, the bolt section 5d of the gas generator 5A is formed to have a D-shaped cross-section while the bolt section insertion hole 35 and the like are so shaped in cross-section as to correspond to the cross-sectional shape of the bolt section 5d.

Although only an embodiment has been shown and described as the airbag restraint unit 1A of the present invention, it will be appreciated that a variety of structures may be applied to the respective parts of the airbag restraint unit 1A, in which the gas generator 5A, the lower base 6, the upper base 10, the retainer 14 and the airbag 7A are changeable in shape and structure.

What is claimed is:

1. An airbag restraint unit comprising:

a gas generator storage container including an upper base section having a first mounting portion and a different and separate second mounting portion, and a lower base section fixedly secured to said upper base section at said first mounting portion by first fastening means and located below said upper base section, said upper base section being formed with a gas ejection opening, said lower base section having first and second end walls which are separate from each other and located opposite to each other, said first end wall being formed with a gas generator insertion hole, said second end wall being formed with a bolt section insertion hole;

a gas generator for generating gas and ejecting gas through gas ejection holes thereof, said gas generator being disposed in said storage container and including an elongate body section, said gas generator having a bolt section located at one end portion of said gas generator, said gas generator being inserted into said storage container through said lower base section gas generator insertion hole to be located at a predetermined position at which said bolt section is inserted in said bolt section insertion hole of said lower base section second end wall to be fastened in position with a nut;

an airbag fixedly secured to said storage container upper base section at said second mounting portion by second fastening means in a manner that gas from said gas generator is introduced into said airbag through said upper base section gas ejection opening, said second fastening means being different from said first fastening means, wherein said gas generator and said airbag are located, respectively, on opposite sides of said second mounting portion of said upper base section of said gas generator storage container;

an airbag cover for covering said airbag in a folded state; and at least one support section for supporting said body section of said gas generator, said support section being formed on an inner surface of at least one of said upper and lower base sections, said support section extending generally in a direction traversing the axis of said gas generator body in plan, said support section guiding said gas generator to said predetermined position when said gas generator is inserted into said storage container.

2. An airbag restraint unit as claimed in claim 1, wherein said support section extends generally in a direction of insertion of said gas generator, in plan.

3. An airbag restraint unit as claimed in claim 1, wherein said gas ejection opening of said storage container upper base section is located at a central part of an upper portion of said upper base section, said gas ejection opening being defined by being surrounded with a rectangular frame section forming part of said upper portion.

4. An airbag restraint unit as claimed in claim 3, wherein said upper portion of said upper base section includes a plurality of bridge sections which connect two opposite edges of said frame section so as to define a plurality of gas ejection openings, wherein said support section is formed at an inner surface and located separate from the gas ejection holes of said gas generator in plan so that gas ejected from said gas generator is prevented from being interrupted by said bridge sections.

5. An airbag restraint unit comprising:

a gas generator storage container including an upper base section, and a lower base section fixedly secured to and located below said upper base section, said upper base section being formed with a gas ejection opening, said lower base section having first and second end walls which are separate from each other and located opposite to each other, said first end wall being formed with a gas generator insertion hole, said second end wall being formed with a bolt section insertion hole:

a gas generator for generating gas and ejecting gas through gas ejection holes thereof, said gas generator being disposed in said storage container and including an elongate body section, said gas generator having a bolt section located at one end portion of said gas generator, said gas generator being inserted into said storage container through said lower base section gas generator insertion hole to be located at a predetermined position at which said bolt section is inserted in said bolt section insertion hole of said lower base section second end wall to be fastened in position with a nut;

an airbag fixedly secured to said storage container upper base section in a manner that gas from said gas generator is introduced into said airbag through said upper base section gas ejection opening;

an airbag cover for covering said airbag in a folded state;

at least one support section for supporting said body section of said gas generator, said support section being formed on an inner surface of at least one of said upper and lower base sections, said support section extending generally in a direction traversing the axis of said gas generator body in plan, said support section guiding said gas generator to said predetermined position when said gas generator is inserted into said storage container; and a support bracket fixed to an inside surface of said second end wall of said storage container lower base section and located coaxial with the bolt section insertion hole of said second end wall, said support bracket having a plurality of retaining fingers for guiding and retaining the tip end portion of said gas generator, said support bracket being formed with a bolt section insertion hole located corresponding to said bolt section insertion hole of said lower base section second end wall.

6. An airbag restraint unit as claimed in claim 6, further comprising means for preventing said gas generator from rotating, said means including an engagement projection formed adjacent said bolt section of said gas generator, and means defining an engagement space in said support bracket, said engagement projection being fittable within said engagement space.

7. An airbag restraint unit as claimed in claim 1, wherein said at least one support section includes a plurality of first support sections formed on said inner surface of said upper base section, and a plurality of second support sections formed on said inner surface of said lower base section.

8. An airbag restraint unit comprising:

a gas generator storage container including an upper base section having a first mounting portion and a different and separate second mounting portion, and a lower base section fixedly secured to said upper base section at said first mounting portion by first fastening means and located below said upper base section, said upper base section being formed with a gas ejection opening, said lower base section having first and second end walls which are separate from each other and located opposite to each other, said first end wall being formed with a gas generator insertion hole, said second end wall being formed with a bolt section insertion hole;

a gas generator for generating gas and ejecting gas through gas ejection holes thereof, said gas generator being disposed in said storage container and including an elongate body section, said gas generator having a bolt section located at one end portion of said gas generator, said gas generator being inserted into said storage container through said lower base section gas generator insertion hole to be located at a predetermined position at which said bolt section is inserted in said bolt section insertion hole of said lower base section second end wall to be fastened in position with a nut;

an airbag fixedly secured to said storage container upper base section at said second mounting portion by second fastening means in a manner that gas from said gas generator is introduced into said airbag through said upper base section gas ejection opening, said second fastening means being different from said first fastening means;

an airbag cover for covering said airbag in a folded state; and at least one support section for supporting said body section of said gas generator, said support section being formed on an inner surface of at least one of said upper and lower base sections, said support section extending generally in a direction traversing the axis of said gas generator body in plan, said support section guiding said gas generator to said predetermined position when said gas generator is inserted into said storage container; and a support bracket fixed to an inside surface of said second end wall of said storage container lower base section and located coaxial with the bolt section insertion hole of said second end wall, said support bracket having a plurality of retaining fingers for guiding and retaining the tip end portion of said gas generator, said support bracket being formed with a bolt section insertion hole located corresponding to said bolt section insertion hole of said lower base section second end wall.

9. An airbag restraint unit as claimed in claim 8, further comprising means for preventing said gas generator from rotating, said means including an engagement projection formed adjacent said bolt section of said gas generator, and means defining an engagement space in said support bracket, said engagement production being fittable within said engagement space.

* * * * *